United States Patent
Köhler

(10) Patent No.: US 6,212,500 B1
(45) Date of Patent: Apr. 3, 2001

(54) PROCESS FOR THE MULTILINGUAL USE OF A HIDDEN MARKOV SOUND MODEL IN A SPEECH RECOGNITION SYSTEM

(75) Inventor: Joachim Köhler, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/254,775

(22) PCT Filed: Sep. 2, 1997

(86) PCT No.: PCT/DE97/01923

§ 371 Date: Mar. 9, 1999

§ 102(e) Date: Mar. 9, 1999

(87) PCT Pub. No.: WO98/11537

PCT Pub. Date: Mar. 19, 1998

(30) Foreign Application Priority Data

Sep. 10, 1996 (DE) .............................................. 196 36 739

(51) Int. Cl.⁷ ................................. G10L 5/06; G10L 9/00

(52) U.S. Cl. .......................... 704/256; 704/243; 704/244; 704/245; 704/1; 704/2; 704/9; 704/10

(58) Field of Search ..................................... 704/231, 243, 704/257, 256, 244, 245, 9, 10, 1, 2

(56) References Cited

U.S. PATENT DOCUMENTS

| | | | |
|---|---|---|---|
| 5,758,023 | * 5/1998 | Bordeaux | 704/232 |
| 5,805,771 | * 9/1998 | Muthusumy et al. | 704/243 |
| 5,835,888 | * 11/1998 | Kanevsky et al. | 704/9 |
| 5,867,811 | * 2/1999 | O'Donoghue | 704/1 |
| 5,991,721 | * 11/1999 | Asano et al. | 704/257 |

OTHER PUBLICATIONS

Babin et al, Incorporation of time barying AR modeling in speech recognition . . . , , IEEE Proceedings, pp 289–292, Mar. 1991.*

Sze et al., Branch and bound algorithm for Bayes classifier, IEEE Pattern Recognition, pp 705–709, Mar. 1991.*

"Training Data Clustering for Improved Speech Recognition", Sankar et al., in Proc. EUROSPEECH '95, pp. 503–506, Madrid, 1995.

"Identification of Mono–and Poly–phonemes Using Acoustic–phonetic Features Derived by a Self–organising Neural Network", Dalsgaard et al., in Proc. ICSLP '92, pp. 547–550, Banff, 1992.

"Methods for Improved Speech Recognition Over the Telephone Lines", Hauenstein et al., in Proc. ICASSP '95, pp. 425–428, Detroit, 1995.

"ASCII Phonetic Symbols for the World's Languages: Worldbet.", Hieronymus, preprint, 1993.

"A Course in Phonetics", Ladefoged, Harcourt Brace Jovanovich, San Diego 1993.

Data–driven Identification of Poly–and Mono–phonemes for Four European Languages:, Andersen et al., Proc. EUROSPEECH '93, pp. 759–762, Berlin, 1993.

"The OGI Multi–language Telephone Speech Corpus", Muthusamy et al., in Proc. IC–SLP '92, pp. 895–898, banff, 1992.

(List continued on next page.)

Primary Examiner—David D. Knepper
Assistant Examiner—Robert Louis Sax
(74) Attorney, Agent, or Firm—Schiff Hardin & Waite

(57) ABSTRACT

In a method for determining the similarities of sounds across different languages, hidden Markov modelling of multilingual phonemes is employed wherein language-specific as well as language-independent properties are identified by combining of the probability densities for different hidden Markov sound models in various languages.

9 Claims, 1 Drawing Sheet

OTHER PUBLICATIONS

"An Evaluation of Cross–Language Adaption for Rapid HMM Development in a New Language", Wheatley et al., Proc. ICASSPP, Adelaide, 1994, pp. 237–240.

"Multi–Lingual Phoneme Recognition Exploiting Acoustic–Phonetic Similarities of Sounds," Köhler, Proceedings of International Conference on Spoken Language Processing, Oct. 3–6, 1996, vol. 4, pp. 825–828.

Application of Clustering Techniques To Mixture Density Modelling For Continuous–Speech Recognition, Dugast et al, Proceedings Of The International Conference On Acoustics, Speech and Signal Processing, May 9–12, vol. 1, pp. 524–527, 1995.

* cited by examiner

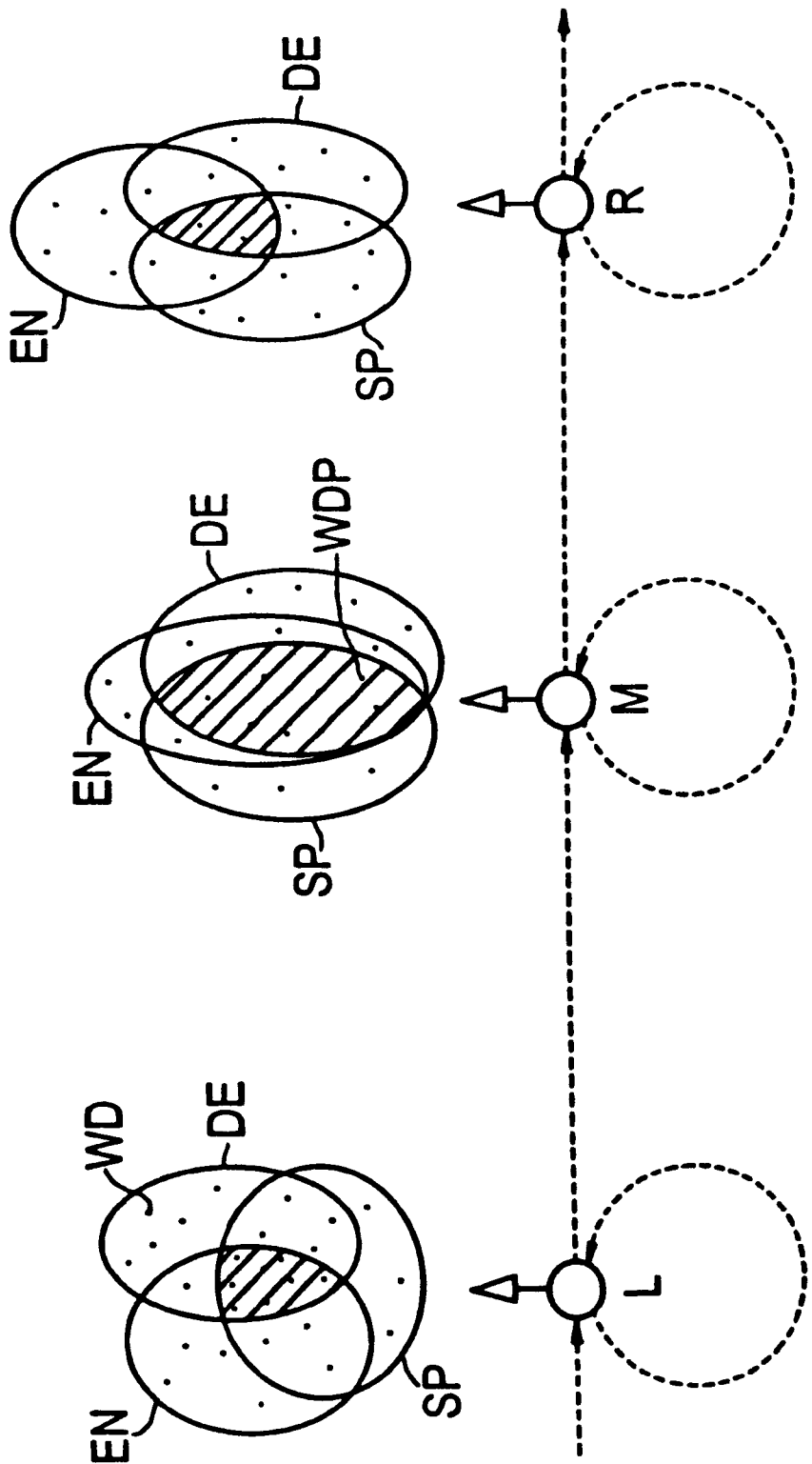

PROCESS FOR THE MULTILINGUAL USE OF A HIDDEN MARKOV SOUND MODEL IN A SPEECH RECOGNITION SYSTEM

BACKGROUND OF THE INVENTION

Field of the Invention

The invention is directed to hidden Markov models for speech recognition systems, of a type suitable for use for a number of languages in that the acoustic and phonetic similarities between the different languages are exploited.

Description of the Prior Art

A great problem in speech recognition is comprised therein that new acoustic phonetic models must be trained for every language in which the speech recognition technology is to be introduced in order to be able to implement a national match. Hidden Markov models for modelling the language-specific sounds are usually employed in standard speech recognition systems. Acoustic word models that are recognized during a search process in the speech recognition procedure are subsequently compiled from these statistically modelled sound models. Very extensive speech data banks are required for training these sound models, the collection and editing of these representing an extremely cost-intensive and time-consuming process. Disadvantages thereby arise when transferring a speech recognition technology from one language into another language since the production of a new speech data bank means, on the one hand, that the product becomes more expensive and, one the other hand, causes a time delay in the market introduction.

Language-specific models are exclusively employed in standard purchasable speech recognition systems. Extensive speech data banks are collected and edited for transferring these systems into a new language. Subsequently, the sound models for the new language are re-trained from square one with these collected voice data.

In order to reduce the outlay and the time delay when transferring speech recognition systems into different languages, an examination should thus be made to see whether individual sound models are suitable for employment in different languages. The article by Dalsgaard et al. entitled "Identification of Mono- and Poly-phonemes using acoustic-phonetic Features derived by a self-organising Neural Network," in Proc. ICSLP '92, pages 547–550 discloses approaches for producing multilingual sound models and utilizing these in the speech recognition in the respective languages. The terms 'polyphoneme' and 'monophoneme' are also introduced there. The term polyphonemes means sounds whose sound formation properties are similar enough over several languages in order to be equated.

Monophonemes indicate sounds that exhibit language-specific properties. So that new speech data banks do not have to be trained every time for such development work and investigations, these are already available as a standard as described in "Data-driven Identification of Poly- and Mono-phonemes for four European Languages," Andersen et al., Proc. EUROSPEECH '93, pages 759–762 (1993); "ASCII Phonetic Symbols for the World's Languages: Worldbet." Hieronymus, preprint, (1993); and "The OGI Multi-language Telephone Speech Corpus", Cole et al., Proc. ICSLP '92, pages 895–898,(1992) The aforementioned article by Andersen et al. from Proc. EUROSPEECH '93discloses the employment of particular phonemes and hidden Markov sound models of these phonemes for a multilinguistic speech recognition.

SUMMARY OF THE INVENTION

An object of the present is to provide a method for multilingual employment of a hidden Markov sound model with which the transfer outlay of speech recognition systems into a different language is minimized in that the parameters in a multilingual speech recognition system are reduced.

The above object is achieved in accordance with the principles of the present invention in a first embodiment of a method for modelling a sound in at least two languages wherein a first feature vector for a first spoken sound in a first language is identified and a second feature vector for a second spoken sound, comparable to the first spoken sound, is identified in a second language. A first hidden Markov sound model is selected from a library of standard Markov sound models, which most closely models the first feature vector, and a second hidden Markov sound model is selected from the library which most closely models the second feature vector. A predetermined criterion is employed to select one of the first or second hidden Markov sound models as the better of these two models for modelling both of the first and second feature vectors. Both of the first and second spoken words in the respective first and second languages are then modeled using the selected one of the first or second hidden Markov sound models.

In a second embodiment of the inventive method, a first hidden Markov sound model for a first sound in a first language is identified and a second hidden Markov sound model for a comparable spoken second sound in a second language are identified, and a polyphoneme model is formed by combining the respective standard probability distributions employed for the modelling of the first and second hidden Markov sound models so as to form a new standard probability distribution. This new standard probability distribution is formed up to a defined distance threshold, which indicates the maximum distance (window) within which the aforementioned two standard probability distributions should be combined. Only the new standard probability distribution within this window is then used to characterize the polyphoneme model. The thus-characterized polyphoneme model is then employed for modelling both the first sound and the second sound in the respective first and second languages.

A particular advantage of the inventive method is that a statistical similarity criterion is specified that allows that sound model whose characteristic best describes all feature vectors of the respective sound that are available to be selected from a given number of different sound models for similar sounds in different languages.

The logarithmic probability distance between the respective hidden Markov models and each and every feature vector is especially advantageously determined as criterion for the selection of the best hidden Markov model for different sound feature vectors. As a result thereof, a criterion is made available that reflects experimental findings with respect to the similarity of individual sound models and their recognition rates.

The arithmetic mean of the logarithmic probability distances between each hidden Markov model and the respective feature vectors is especially advantageously formed as criterion for the description of an optimally representative hidden Markov sound model in the invention since a symmetrical distance value is thereby obtained.

DESCRIPTION OF THE DRAWING

The single FIGURE is a Venn diagram for explaining the inventive method.

DESCRIPTION OF THE PREFERRED EMBODIMENTS

The inventive description criterion for the representative property of a hidden Markov model for describing sounds in different languages is advantageously formed in that Equations 1 through 3 (set forth below) of the invention are applied, since little calculating outlay arises as a result thereof.

A barrier condition with which a recognition rate of the representative hidden Markov model can be set is especially advantageously prescribed for the inventive application.

The memory outlay for a speech library is especially advantageously reduced by the inventive method since one model can be employed for several languages and the transfer outlay from one language into the other is likewise minimized, this creating a reduced time expenditure for the transfer. Just as advantageously, less of a calculating outlay is enabled in the Viterbi search since fewer models have to be checked, for example given multilingual input systems.

Special hidden Markov models for employment in multilingual speech recognition systems are especially advantageously generated in the invention. As a result of the inventive procedure, hidden Markov sound models for sounds in several languages can be combined into polyphoneme models. To this end, overlap areas of the standard probability density distributions employed in the various models are investigated. An arbitrary number of standard probability density distributions identically employed in the different models can be employed for describing the polyphoneme model. Experimental findings have shown that a number of standard distributions from different speech models can be advantageously employed without the smearing of the individual speech characteristics caused as a result thereof leading to a significantly lower recognition rate given the use of this model. The distance threshold value of five between similar standard probability distribution densities has proven to be especially advantageous here.

Upon utilization of the inventive method, the hidden Markov models are especially advantageously modelled with three states of initial sound, median sound and final sound, since an adequate precision in the description of the sounds is thereby achieved and the calculating outlay in the recognition in a speech recognition means remains low.

As an example, FIG. 1 shows the structure of a single multilingual phoneme. In this case, the phoneme M is shown. The number of probability densities and the recognition rate for this phoneme are indicated in Table 4.

| Thr. | # densit(a, b,). | Engl. [%] | Germ. [%] | Span. [%] |
|---|---|---|---|---|
| 0 | 341(0 0 341) | 46.7 | 44.7 | 59.4 |
| 2 | 334(0 14 327) | 45.0 | 46.4 | 57.5 |
| 3 | 303(27 34 280) | 48.0 | 45.8 | 57.5 |
| 4 | 227(106 57 187) | 50.9 | 44.1 | 58.7 |
| 5 | 116(221,48, 72) | 49.3 | 43.1 | 57.0 |
| 6 | 61(285, 22, 34) | 41.2 | 38.6 | 50.4 |

FIG. 1 shows the initial sound L, the median sound M and the final sound R of the phoneme model. The centers of gravity of the probability density distributions of the individual standard probability densities are entered and referenced as WD for the different languages, English EN, German DE and Spanish SP. A hidden Markov model composed of three sub-states is shown here by way of example. The invention, however, is not to be limited only to such hidden Markov models, even though these represent a certain optimum taking the criterion into consideration that a minimum calculating outlay of the recognition should be implemented. The invention can likewise be applied to hidden Markov models that exhibit a different number of states. What the invention is especially intended to achieve is that the transfer outlay given the transfer of speech recognition systems into another language is reduced and that the calculating resources employed are kept as low as possible by reduction of the underlying parameters. For example, such speech recognition systems can meet limited hardware demands better, particularly when one and the same speech recognition system for multilingual application in one apparatus is to be made available.

For achieving the goal of the invention, to exhaust the similarities of sounds in different languages and consider them in the modelling, it should first be noted that the phonemes can differ in various languages. The reasons for this are:

different phonetic contexts because of the different phoneme sets in the various languages;

different manners of speaking;

different prosodic features;

different allophonic variations.

An especially important aspect that must thereby be taken into consideration is the principle of sufficient perception-oriented distinguishability of the phonemes as is generally described in "A Course in Phonetics," Ladefoged (1993). This means that individual sounds in various languages are kept acoustically distinguishable, so that it is easier for the individual listeners to separate them from one another. Since, however, every individual language has a different store of phonemes, the boundaries between two similar phonemes are language-specifically defined in every individual language. For these reasons, the expression of a specific sound has a language-specific component.

The phonemes are preferably modelled with continuous density hidden Markov models (CD-HMM) as described in "Methods for Improved Speech Recognition Over the Telephone Lines," Hauenstein et al., Proc. ICASSP '95, pages 425–428 (1995). Laplace mixtures are often used as dense functions. Each individual phoneme is thereby preferably composed of three states directed from left to right HMM. The acoustic feature vectors are thereby composed, for example, of 24 mel-scaled cepstral, 12 delta delta cepstral, energy, delta energy and delta delta energy coefficients. For example, 25 ms is selected as length of the examination time window, whereby the frame spacings amount to 10 ms between the individual frames. Only context-independent phonemes are preferably generated for reasons of the limited size of the language corpus. The phoneme library described in the aforementioned Hieronymus preprint is suitable for use herein as a phoneme inventory.

The basis of the invention is that, first, a similarity criterion is made available in order to select that hidden Markov model from standard, available speech phoneme libraries for different languages that comes closest to the feature vectors that are derived from the different sound models of the different languages. As a result thereof, it is possible to determine the similarity of two phoneme models and, via this similarity criterion, to make a statement based on the difference of the log likelihood values between the sound realizations and sound models as to whether it is worth modelling a sound for several languages in common or, to employ an appertaining hidden Markov model that already exists for modelling the sound in a number of languages. As a result thereof, the number of parameters to be taken into consideration in the speech recognition is reduced in that the number of hidden Markov models to be examined is reduced.

In a second embodiment of the invention a specific polyphoneme model for modelling a sound in several languages is produced. To this end, three sound segments, for example, are first formed in the form of an initial sound, median sound and final sound, their states being composed of a number of probability density functions, what are referred to as mixed distribution densities with the appertaining densities. These densities of the sound segments that are similar over various languages are compiled to form a multilingual code book. Sound segments of various languages thus share the same densities. Whereas the code book can be simultaneously employed for several languages, the weightings, for example, with which the densities are weighted are separately determined for each language.

Hidden Markov models with three states are preferably utilized for forming a suitable similarity criterion. The distance or similarity criterion can thereby be used in order to combine a number of phoneme models to form a multilingual phoneme model or to replace these in a suitable way. As a result thereof, a multilingual phoneme inventory can be developed. A measured quantity that is based on the relative entropy, as described in "Training Data Clustering for Improved Speech Recognition," Sankar et al., Proc. EUROSPEECH '95, pages 503–506 (1995), is preferably employed for measuring the distance or, for determining the similarity of two phoneme models of the same sound from different languages. During the training, the parameters of the mixed Laplace density distributions of the phoneme models are thereby determined. Further, a set of phoneme tokens X as feature vector is extracted for each phoneme from a test or development language corpus. These phonemes can thereby be marked by their internationally standardized phonetic label. According to the invention, two phoneme models $\lambda_i$ and $\lambda_j$ and their appertaining phoneme token $X_i$ and $X_j$ are handled as follows for determining the similarity criterion between these different phonemes.

$$d(\lambda_i, \lambda_j) = \log p(X_i|\lambda_i) - \log p(X_i|\lambda_j) \quad (1).$$

This distance criterion can be viewed as log likelihood distance that represents how well two different models match with the same feature vector $X_I$. Accordingly, the distance between the two models $\lambda_i$ and $\lambda_j$ is determined according to:

$$d(\lambda_j, \lambda_i) = \log p(X_j|\lambda_j) - \log p(X_j|\lambda_i) \quad (2).$$

In order to obtain a symmetrical distance between these two phoneme models, this is preferably determined according to $$d(\lambda_j;\lambda_i) = \tfrac{1}{2}(d(\lambda_i;\lambda_j) + d(\lambda_j;\lambda_i)) \quad (3).$$

It was determined on the basis of experimental findings that some phoneme models from different languages are definitely better-suited for the employment in a German speech recognition system than a German phoneme model. This, for example, is true of the phonemes k, p and N. The English phoneme model is better-suited for these phonemes than the German. For, for example, a great difference between the German and the English model was observed with respect to the dihpthong aü (German) and oi (English), which means that a different symbol should be introduced in the multilingual phoneme inventory for the two sounds. On the other hand, a great similarity was found for the dihpthong ai in German and in English, which means that only one phoneme model can be employed equally well for both languages. Proceeding therefrom, a separate statistical model should be generated for each symbol of a multilingual phoneme inventory. In the aforementioned Andersen et al. article from EUROSPEECH, '93 polyphonemes were referred to as phonemes that are similar enough in order to be modelled as a single phoneme in various languages. One disadvantage of this procedure is that the complete acoustic space of the polyphoneme is employed for the language-dependent recognition. The goal of the invention, however, is to combine the language-dependent and the language-specific acoustic properties of a multilingual model. According to the invention, those areas of the acoustic space wherein the employed probability densities of the individual phonemes overlap are to be delimited in a polyphoneme model. To this end, for example, an agglomerative density cluster technique is utilized in order to reduce identical or similar expressions of a phoneme. It is thereby especially important to note that only the densities of the corresponding states of the individual hidden Markov models be combined in the phonemes.

It can thereby be seen in FIG. 1 that the respective densities for the individual states L, M and R are contained in the delimited areas. Whereas identical densities are distributed over the individual languages EN, DE and SP, the mixing weightings vary language-dependently. However, it should also be taken into consideration in this evaluation that specific expressions of a phoneme in different languages occur in differing frequency.

The combination of the different probability densities can thereby be implemented with a different distance threshold for the probability densities in the density clustering. With a distance threshold of five, for example, the number of densities employed was reduced by a factor 3 compared to the initial condition without being accompanied by a critical deterioration in the speech recognition rate. In this case, 221, 48 and 72 of the original 341 initial densities were respectively combined for the polyphoneme region, the bilingual region and the monolingual region. FIG. 1 shows such a polyphoneme region as the overlapping of the circles for the individual languages. Given the median sound M of the illustrated hidden Markov model, for example, a probability density in such a region is referenced as WDP. The recognition rates for a complete multilingual speech recognition system are thereby recited in columns 4 and 5 of table 2 as ML1 and ML2.

| Language | # Tokens | LDP [%] | ML1 [%] | ML2 [%] |
| --- | --- | --- | --- | --- |
| English | 21191 | 39.0 | 37.3 | 37.0 |
| German | 9430 | 40.0 | 34.7 | 37.7 |
| Spanish | 9525 | 53.9 | 46.0 | 51.6 |
| Total | 40146 | 42.8 | 38.8 | 40.8 |

Whereas the conventional polyphoneme definition from the aforementioned Andersen et al. article appearing in EUROSPEECH '93 was employed in the first investigation ML1, which means that the complete acoustic region of the polyphoneme model composed of the outer contour of the speech regions in FIG. 1 was employed for the recognition, the inventive method uses only a sub-region therefrom. For example, an improvement of 2% can be achieved in that the partial overlap of the individual language regions is utilized for the individual modelling of the polyphoneme model, as shown in the column for ML2 in Table 2.

Although modifications and changes may be suggested by those skilled in the art, it is the intention of the inventor to embody within the patent warranted hereon all changes and modifications as reasonably and properly come within the scope of his contribution to the art.

What is claimed is:

1. A method for modelling a sound in at least two languages, comprising the steps of:
   (a) identifying a first feature vector for a first spoken sound in a first language;
   (b) identifying a first hidden Markov sound model, from among a plurality of standard Markov sound models in a Markov sound model library, which most closely models said first feature vector;
   (c) identifying a second feature vector for a second spoken sound, comparable to said first spoken sound, in a second language;
   (d) identifying a second hidden Markov sound model from among said plurality of standard Markov sound models in said Markov sound model library, which most closely models said second feature vector;
   (e) employing a predetermined criterion to select one of said first and second hidden Markov sound models as better modelling both of said first and second feature vectors; and
   (f) modelling said first and second spoken sounds in both of said first and second languages using said one of said first and second hidden Markov sound models.

2. A method as claimed in claim 1 wherein identification of the first hidden Markov sound model which most closely models said first feature vector in step (b) and identification of said second hidden Markov sound model which most closely models said second feature vector in step (d) comprise identifying a logarithmic probability distance as a log likelihood distance between each standard Markov sound model in said library and said first feature vector and said second feature vector, respectively, with a shorter logarithmic probability distance denoting a better modelling.

3. A method as claimed in claim 2 wherein step (e) comprises forming an arithmetic mean of said logarithmic probability distance between each Markov sound model in said library and said first feature vector and said second feature vector, respectively, and using said arithmetic mean as said predetermined criterion.

4. A method as claimed in claim 3 wherein said first hidden Markov model is for a phoneme $\lambda_i$, wherein said second hidden Markov sound model is for a phoneme $\lambda_j$, and wherein $X_i$ represents said first feature vector and wherein $X_j$ represents said second feature vector, and wherein the step of identifying the logarithmic probability distance for said first feature vector comprises using the relationship $$d(\lambda_i, \lambda_j) = \log p(X_i|\lambda_i) - \log p(X_i|\lambda_j)$$

and wherein the step of identifying the logarithmic probability distance for said second feature vector employs the relationship $$d(\lambda_j, \lambda_i) = \log p(X_j|\lambda_j) - \log p(X_j|\lambda_i).$$

and wherein the step of forming said arithmetic mean employs the relationship $$d(\lambda_j, \lambda_i) = \tfrac{1}{2}(d(\lambda_i, \lambda_j) + d(\lambda_j, \lambda_i)).$$

5. A method as claimed in claim 4 comprising the additional step of employing the selected one of said first and second hidden Markov sound models from step (e) for modelling of said first and second spoken words in step (f) only if $d(\lambda_j; \lambda_i)$ satisfies a defined barrier condition.

6. A method as claimed in claim 1 comprising the additional step of providing a library of three-state Markov sound models as said Markov sound model library, each three-state Markov sound model comprising a sound segment of initial sound, median sound and final sound.

7. A method for multilingual employment of a hidden Markov sound model in a speech recognition system, comprising the steps of:
   (a) identifying a first hidden Markov sound model for a first spoken sound in a first language, said first hidden Markov sound model having a first standard probability distribution associated therewith;
   (b) identifying a second hidden Markov sound model for a second spoken sound, comparable to said first spoken sound, in a second language, said second hidden Markov sound model having a second standard probability distribution associated therewith;
   (c) combining said first standard probability distribution and said second standard probability distribution to form a new standard probability distribution up to a defined distance threshold, said defined distance threshold identifying a maximum distance between said first and second probability distributions within which said first and second standard probability distributions should be combined;
   (d) forming a polyphoneme model using said new standard probability distribution only within said defined distance threshold and modelling said first and second sounds in both of said first and second languages using said polyphoneme model.

8. A method as claimed in claim 7 wherein said distance threshold is five.

9. A method as claimed in claim 7 comprising employing a three-state Markov sound model as said first hidden Markov sound model in step (a), said three-state Markov sound model comprising an initial sound segment, a median sound segment and a final sound segment of said first sound, and employing a three-state Markov sound model as said second hidden Markov sound model formed by an initial sound segment, a median sound segment and a final sound segment of said second sound.

* * * * *